(12) United States Patent
Durat et al.

(10) Patent No.: US 9,056,531 B2
(45) Date of Patent: Jun. 16, 2015

(54) TIRE STUD PROVIDED WITH RECESSES CONFIGURED TO IMPROVE ITS RETENTION IN THE TIRE

(75) Inventors: Matthieu Durat, Clermont-Ferrand (FR); Cyril Guichon, Greer, SC (US)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1223 days.

(21) Appl. No.: 12/995,178

(22) PCT Filed: May 25, 2009

(86) PCT No.: PCT/EP2009/056305
§ 371 (c)(1),
(2), (4) Date: Mar. 14, 2011

(87) PCT Pub. No.: WO2009/144198
PCT Pub. Date: Dec. 3, 2009

(65) Prior Publication Data
US 2011/0146865 A1 Jun. 23, 2011

Related U.S. Application Data

(60) Provisional application No. 61/190,568, filed on Aug. 29, 2008.

(30) Foreign Application Priority Data

May 29, 2008 (FR) ..................... 08 53490

(51) Int. Cl.
*B60C 11/00* (2006.01)
*B60C 11/14* (2006.01)
*B60C 11/16* (2006.01)

(52) U.S. Cl.
CPC ............. *B60C 11/16* (2013.01); *B60C 11/1643* (2013.04)

(58) Field of Classification Search
CPC ...... B60C 11/14; B60C 11/16; B60C 11/1643
See application file for complete search history.

(56) References Cited

U.S. PATENT DOCUMENTS

| 3,220,455 | A | | 11/1965 | Sowko | |
|---|---|---|---|---|---|
| 3,404,718 | A | * | 10/1968 | Smith | 152/210 |
| 3,538,970 | A | * | 11/1970 | Shwayder | 152/210 |
| 3,837,386 | A | | 9/1974 | Lejeune | |
| 6,910,666 | B2 | * | 6/2005 | Burr | 248/188.4 |
| 2004/0079461 | A1 | | 4/2004 | Salakari | |

FOREIGN PATENT DOCUMENTS

| CN | 1533334 | 9/2004 |
|---|---|---|
| DE | 22 28 753 | 1/1974 |
| EP | 0 729 826 A2 | 4/1996 |

(Continued)

*Primary Examiner* — Justin Fischer
(74) *Attorney, Agent, or Firm* — Cozen O'Connor

(57) ABSTRACT

Stud (30) for a tire (10), the tire comprising a tread (20) made of rubber mix, the stud having an axis (A-A) and two axial ends and comprising: a first part (60) configured to come into contact with the ground when the stud is fitted to the tire and the tire is rolling along the ground, this first part being positioned at one of the axial ends of the stud; a head (70) configured to anchor the stud into the tread of the tire, the head being positioned at the other axial end of the stud; and a body (80) connecting the said first part and the head of the stud, the mean diameter of the body being smaller than the mean diameter of the head of the stud, these diameters being measured at right angles to the axis of the stud; in which the head comprises at least one recess (100) opening onto the surface of the head, the recess being configured to be filled with rubber mix of the tread so as to provide additional anchorage for the stud in the tread.

11 Claims, 4 Drawing Sheets

(56) References Cited

FOREIGN PATENT DOCUMENTS

| FR | 1 403 818 | 11/1965 | |
| FR | 1 433 569 | 6/1966 | |
| FR | 2 125 188 | | 9/1972 |
| FR | 2 182 750 | | 12/1973 |
| GB | 190920039 | * | 9/1910 |
| JP | 4-274906 | * | 9/1992 |
| SU | 1533878 | * | 1/1990 |

* cited by examiner

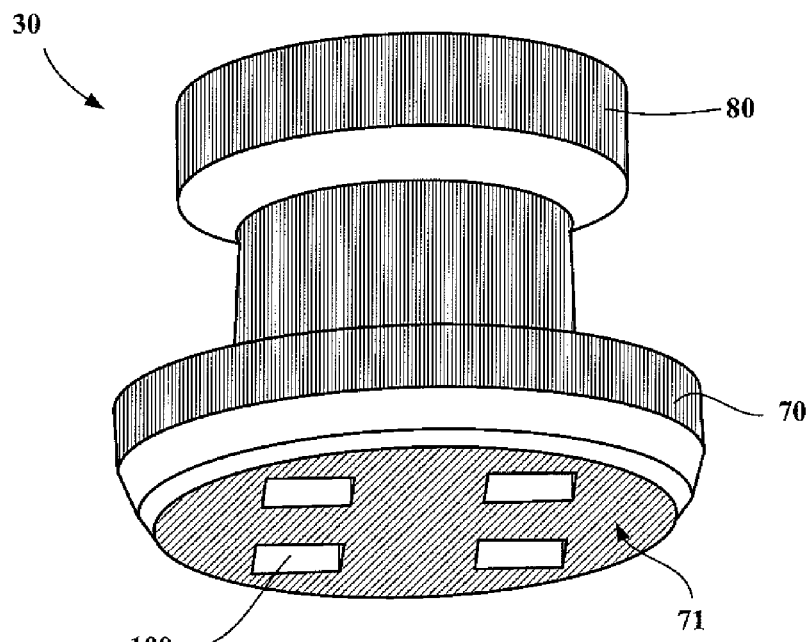
FIG. 5
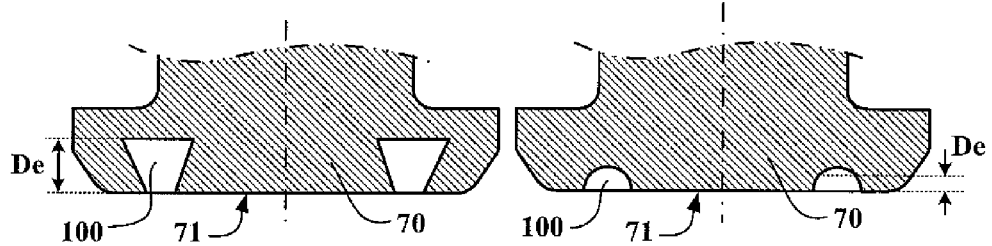
FIG. 6
FIG. 7
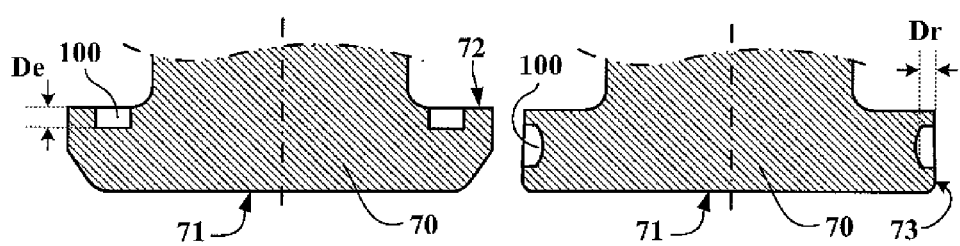
FIG. 8
FIG. 9

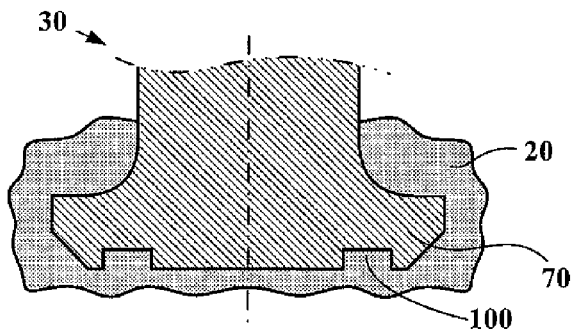
FIG. 10
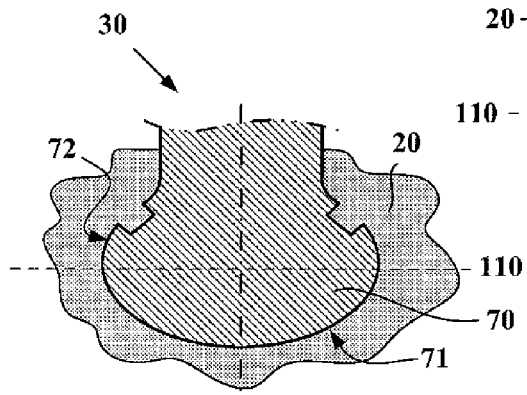
FIG. 11
FIG. 12
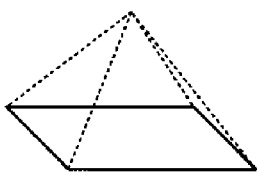
FIG. 13A
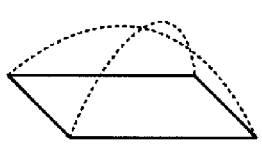
FIG. 13B
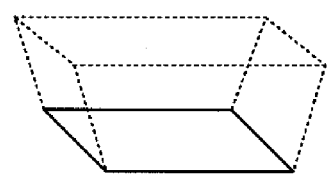
FIG. 13C
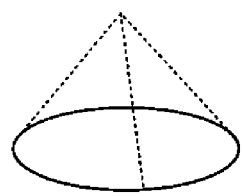
FIG. 13D
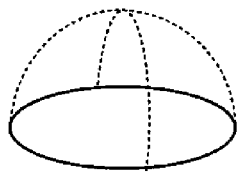
FIG. 13E
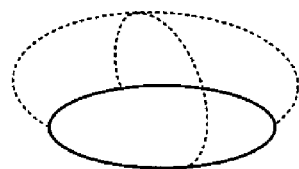
FIG. 13F

TIRE STUD PROVIDED WITH RECESSES CONFIGURED TO IMPROVE ITS RETENTION IN THE TIRE

RELATED APPLICATIONS

This is a U.S. national stage of application No. PCT/EP2009/056305, filed on May 25, 2009.

This patent application claims the priority of French patent application Ser. No. 08/53490 filed May 29, 2008, and U.S. Provisional application No. 61/190,568, the disclosure contents of both of which are hereby incorporated by reference.

FIELD OF THE INVENTION

The present invention relates to studs for tires, particularly for tires specially designed for winter conditions. It also relates to the tires configured to be equipped with such studs and to the assemblies formed by such tires and studs.

BACKGROUND

Studded tires have undeniable advantages in terms of their behavior under winter driving conditions, such as when driving on an icy road surface for example. Contact with the ice and, more specifically, the way in which the stud digs into the ice compensates for the loss of grip observed at the tire tread pattern.

Tires fitted with studs unfortunately have certain disadvantages which have persisted down through new generations of products. On the one hand, the operations of studding the tires are painstaking and tricky to perform and, on the other hand, when driving, the studs are often expelled from their housing or stud hole. In some instances, the loss of studs is considerable and causes the tires to lose effectiveness.

SUMMARY OF THE INVENTION

One of the objectives of the present invention is to provide studs which are more firmly retained in the tread and have better resistance to being pulled out.

This objective is achieved by one aspect of the invention directed to a stud for a tire, the tire comprising a tread made of rubber mix, the stud having an axis and two axial ends and comprising: a first part configured to come into contact with the ground when the stud is fitted to the tire and the tire is rolling along the ground, this first part being positioned at one of the axial ends of the stud; a head configured to anchor the stud into the tread of the tire, the head being positioned at the other of the axial ends of the stud; and a body connecting the said first part and the head of the stud, the mean diameter of the body being smaller than the mean diameter of the head of the stud, these diameters being measured at right angles to the axis of the stud. The head of the stud comprises at least one recess opening onto the surface of the head, the recess being configured to be filled with rubber mix of the tread so as to provide additional anchorage for the stud in the tread.

When a stud such as this is inserted into a tire that has a tread made of rubber mix, that part of the tread that envelopes the head of the stud deforms and thus fills the recess in the head of the stud, anchoring the stud more firmly into the tread. That portion of rubber mix that fills the recess thereafter plays a part in keeping the stud in its ideal position and returning it to this position if the forces applied to the stud as a result of driving cause the stud temporarily to deviate from its rest position.

The recess in the stud also allows the mass of this stud to be reduced, the advantage of this being to reduce road wear and noise.

As a preference, the mean axial depth of the recess is greater than or equal to 0.5 mm. If the mean axial depth of the recess is less than 0.5 mm then the anchoring effect becomes small.

For the same reason, it is preferable to ensure that the cross section of the recess at the surface of the head is greater than or equal to 10% of the maximum cross section of the head at right angles to the axis of the stud.

According to an advantageous embodiment, the stud comprises a plurality of recesses and the combined surface area of the cross sections of the recesses at the surface of the head is greater than or equal to 15% of the maximum cross section of the head at right angles to the axis of the stud. Thus highly effective anchorage can be achieved.

As a preference, the combined surface area of the cross sections of the recesses at the surface of the head is less than or equal to 35% of the maximum cross section of the head at right angles to the axis of the stud. This upper limit also applies to the case where the head has just one recess. When the cross section of the recess or the combined surface area of the cross sections exceeds 35% of the maximum cross section of the head at right angles to the axis of the stud then head retention may prove insufficient.

According to a first preferred embodiment, the head has a flat surface at the opposite end to the said first part and at least one recess is positioned in this surface of the head. When the stud is fitted into the tread, this surface is the surface furthest towards the inside of the tread, that is to say the surface furthest away from the rolling surface. This location is advantageous insofar as the region under the head of the stud is the region where the pressures are the highest. It is also the region furthest from the point at which the stud digs into the ice. By positioning the recess at this location the lever arm and therefore the anti-tilting torque, is maximized. Finally, this is the region that will become worn away in the very last instance; by positioning the recess here, the mechanism is given greater endurance.

According to an advantageous alternative form of this embodiment, at least one recess positioned in the flat surface on the opposite side to the said first part of the stud is radially eccentric with respect to the axis of the stud. Thus, when the stud is fitted into the tread and the recess is filled with rubber mix, the rubber mix contained in the recess opposes any rotational movement of the stud about its axis.

According to a second preferred embodiment, which may advantageously be combined with the first preferred embodiment, the head comprises a surface configured to act as an anti-pull-out surface and at least one recess is positioned in this surface that acts as an anti-pull-out surface.

According to a third preferred embodiment which may advantageously be combined with the first preferred embodiment and/or the second preferred embodiment, the head comprises a lateral surface and at least one recess is positioned in this lateral surface.

As a preference, the mean radial depth of such a recess is greater than or equal to 0.5 mm.

A recess may, for instance, have a geometry which is that of a parallelepiped, a prism, a pyramid, a hemisphere, a cylinder or an ellipsoid.

Another aspect of the invention relates to a tire comprising a tread made of rubber mix, the tread having at least one stud hole comprising a cylindrical portion open to the outside of the tread, the stud hole being designed to accept a stud according to the invention, the tread comprising a projecting part situated on the inside of the stud hole and configured to fill the recess of the stud when the stud is fitted into the stud hole. The use of a tire such as this guarantees that the recess in the stud will be filled with rubber mix and improves the "self-positioning" phenomenon because there is almost a clip-fastening effect when the stud is in the desired position relative to the stud hole.

Another aspect of the invention relates to an assembly formed of a tire and at least one stud according to the invention, particularly an assembly formed by a tire according to the invention and a stud according to the invention.

BRIEF DESCRIPTION OF THE DRAWINGS

FIGS. 5 to 9 depict part of the body and of the head of a stud according to an embodiment of the invention.

FIGS. 10 to 12 depict part of the body and the head of a stud according to an embodiment of the invention, inserted in a stud hole.

FIGS. 13A to 13F depict several recess geometries according to an embodiment of the invention.

DETAILED DESCRIPTION OF THE DRAWINGS

The "axis" of a stud corresponds to the axis of symmetry of the stud in the direction of its longest dimension that passes through the surface of the stud configured to come into contact with the ground when the stud is fitted to a tire and the tire is rolling along the ground, if the stud has such an axis of symmetry. In a stud with no such axis of symmetry, the "axis" denotes the direction of the longest dimension of the stud that passes through the surface of the stud configured to come into contact with the ground when the stud is fitted to a tire and the tire is rolling along the ground.

The term "axial" denotes a direction parallel to the axis of the stud. This term is therefore not used to denote a direction parallel to the axis of rotation of a tire.

Likewise, in the context of this document, the term "radial" does not correspond to the common use of the term in the field of tires. It relates rather to a direction perpendicular to the axis of the stud.

The "head" of the stud here means that end of the stud that serves to anchor the stud in the tread of a tire. The head has a mean radial diameter greater than the mean radial diameter of the body of the stud. The transition between the body of the stud and the head is usually via a groove the diameter of which is smaller than the radial diameters of the head and of the body.

The "rolling surface" here means all of the points on the tread that come into contact with the ground when the tire is rolling along without the studs being inserted into the tread.

The expression "rubber mix" denotes a rubber composition comprising at least one elastomer and one filler.

Figure 1:
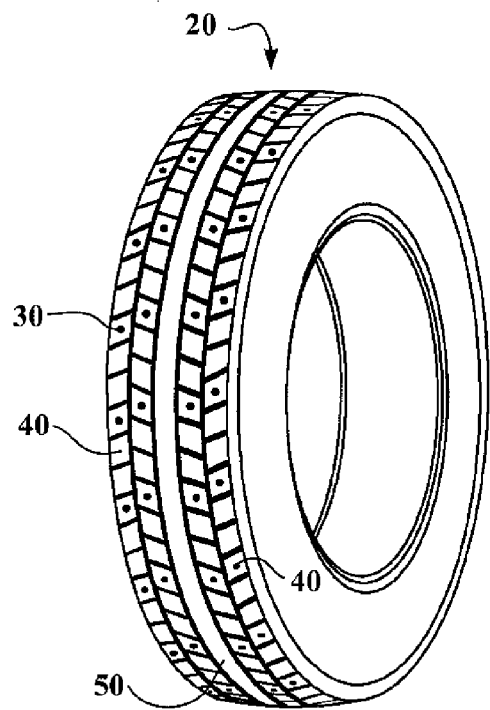
FIG. 1 depicts a tire according to the prior art, fitted with studs.

FIG. 1 schematically depicts a tire 10 according to the prior art, the tread 20 of which is fitted with a number of studs 30. The studs 30 are positioned across the entire width of the rolling surface in the tread blocks 40 of the tread 20. The central bar 50 of the tread may also be fitted with studs 30. The studs 30 are positioned in several locations around the periphery of the tire so that at every moment there are studs in contact with the ground over which the tire is rolling.

Figure 2:
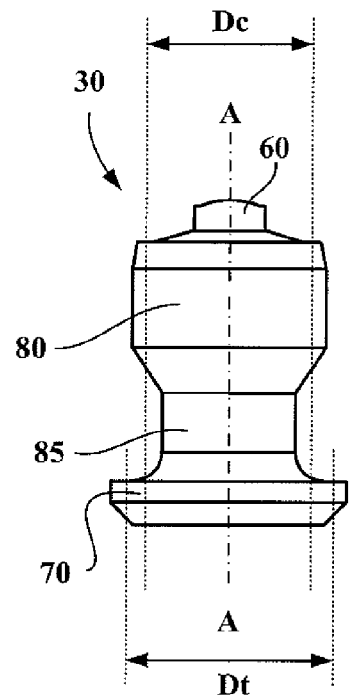
FIG. 2 depicts a stud according to the prior art.

FIG. 2 schematically depicts a stud 30 according to the prior art. The stud 30 has a longitudinal axis A-A. The profile of the stud 30 is generally cylindrical and centered on the axis A-A. The stud 30 has two axial ends: one of the axial ends defines a first part, here embodied by an "insert" 60, configured to come into contact with the ground (the ice, the snow, or the bare road surface) when the stud 30 is fitted to the tire 10 and the tire 10 is rolling along the ground. The insert may advantageously be made of a material that is different from the material of the remainder of the stud. That means that a harder material can be used for this part which is subjected to very high mechanical stresses. That also makes it possible, in the case of certain embodiments, to produce a molded or injection-molded body to which an insert is attached. Of course, studs made of a single material could also be used. In other words, the first part 60 is not necessarily an insert (i.e. a piece that is separate from the remainder of the stud and inserted into it); it can be integral with the stud in the sense that the first part 60 is made of the same material as the rest of stud 30 and is manufactured together with it as one piece.

The other end of the stud 30 is formed of a head 70 which is configured to anchor the stud 30 into the tread 20 of the tire 10.

A body 80 connects the first part 60 to the head 70 of the stud 30. The mean diameter Dc of the body is smaller than the mean diameter Dt of the head 70 of the stud 30, these diameters being measured at right angles to the axis of the stud. The body 80 is separated from the head 70 by a groove 85.

Figure 3:
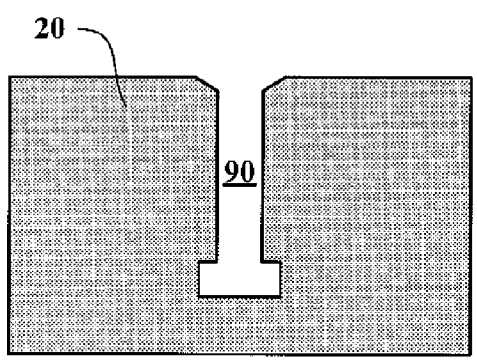
FIG. 3 depicts a stud hole according to the prior art.

FIG. 3 schematically depicts part of the tread 20 of the tire 10. This tread has a stud hole 90, each stud hole comprising a cylindrical portion open to the outside of the tread 20 of the tire 10 and designed to receive a stud 30.

Figure 4:
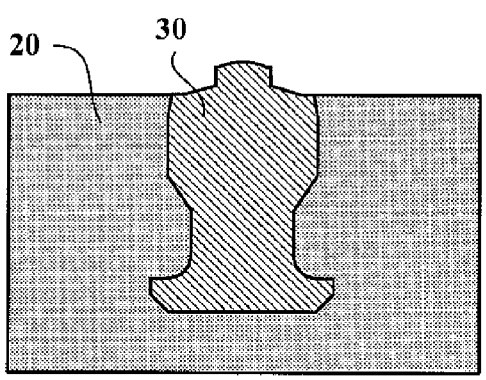
FIG. 4 depicts a stud inserted in a stud hole, according to the prior art.

FIG. 4 schematically depicts the same part of the tread 20 once the stud 30 has been fitted. Thanks to the elasticity of the rubber mix of which the tread is made, the tread 20 perfectly envelopes the stud 30 and firmly anchors it into the tire.

Studded tires like the one depicted in FIG. 1 have undeniable advantages in terms of their behavior under winter driving conditions, such as when driving on an icy road surface for example. Contact with the ice and, more specifically, the way in which the stud digs into the ice compensates for the loss of grip observed at the tire tread pattern.

These studs unfortunately have certain disadvantages which have persisted down through new generations of products. On the one hand, the operations of studding the tires are painstaking and tricky to perform and, on the other hand, when driving, the studs are often expelled from their housing or stud hole. In some instances, the loss of studs is considerable and causes the tires to lose effectiveness.

These problems are reduced by using studs according to the invention. FIGS. 5 to 9 depict part of the body and head of such studs.

FIG. 5 schematically depicts the head 70 and part of the body 80 of a stud according to the invention. The stud 70 comprises a flat surface 71 at the opposite end to the first part (not depicted) and four recesses 100 opening onto the surface of the head are positioned in this surface 71 of the head 70. These recesses 100 are of parallelepipedal geometry. The recesses 100 are configured to be filled with rubber mix from the tread, so as to provide additional anchorage of the stud in the tread.

The cross section of each of the recesses 100 at the surface 71 of the head is equal to 4% of the maximum cross section of the head at right angles to the axis of the stud. As a result, the combined surface area of the cross sections of the recesses at the surface of the head is equal to 16% of the maximum cross section of the head at right angles to the axis of the stud. As a matter of fact it has been found that, for studs comprising a plurality of recesses, highly effective anchorage and good head retention can be achieved when the combined surface area of the cross sections of the recesses at the surface of the head is greater than or equal to 15% and less than or equal to 35% of the maximum cross section of the head at right angles to the axis of the stud.

FIG. 6 schematically shows a second head 70 of a stud 30 according to the invention. The two recesses 100 depicted have a "mortise" shaped prismatic geometry and a mean axial depth De of 2 mm each.

FIG. 7 schematically depicts a third head 70 of a stud 30 according to the invention. The two recesses 100 depicted have a hemispherical geometry and a mean axial depth De of 1 mm each.

FIGS. 5 to 7 depict heads 70 comprising a flat surface 71 on the opposite side to the first part 60 and with recesses 100 positioned in this flat surface 71. A stud according to the invention may also have recesses positioned on other parts of its head, as shown by FIGS. 8 and 9.

FIG. 8 schematically depicts a fourth head 70 of a stud 30 according to the invention. The head 70 comprises a surface 72 configured to act as an "anti-pull-out" surface, that is to say as a surface that will be subjected to stress when a pulling (or centrifugal) force is applied to the stud. Four recesses 100 (only two of which are visible in the section shown) are positioned in this surface that acts as an anti-pull-out surface. The two recesses 100 depicted have a cylindrical geometry and a mean axial depth De of 1.5 mm each.

FIG. 8 schematically depicts a fifth head 70 of a stud 30 according to the invention. The head 70 comprises a lateral surface 73 and two recesses 100 are located in this lateral surface 73. A "lateral surface" here means a surface comprising a direction parallel to the axis of the stud. The mean radial depth Dr of the recess here is equal to 1 mm.

Of course it is possible, and even advantageous, to provide for a head to comprise two, or even all, of the types of surface, each having recesses.

FIG. 10 depicts part of the body and of the head 70 of a stud 30 according to the invention, after it has been inserted in a stud hole. Part of the tread 20 which envelopes the head of the stud deforms thus filling the recess 100 in the head of the stud. This part thereafter plays a part in keeping the stud 30 in its ideal position and returning it to this position if the forces acting on the stud as a result of driving cause the stud 30 temporarily to deviate from its rest position.

The head 70 of a stud according to the invention may have very varied geometries. FIG. 11 depicts part of the body and the head 70 of a stud 30 which does not have any flat surface at the opposite end to the first part (not depicted) of the stud, nor does it have any real lateral surface to speak of. It is nonetheless possible to define, within such a stud, because of the enlargement of the head 70, a (curved) surface 71 at the opposite end to the first part 60 and a surface 72 that acts as an "anti-pull-out" surface. The surface "on the opposite end of the first part" corresponds to that part of the surface of the head that lies at an axial distance from the first part that is greater than the axial distance from the first part of the axial position at which the head has its maximum cross section, here marked by the line 110. The surface 72 that acts as an "anti-pull-out" surface corresponds to that part of the surface of the head that lies at an axial distance from the first part that is shorter than the axial distance from the first part of the axial position at which the head has its maximum cross section (line 110). The stud of FIG. 11 therefore has recesses in the surface 71 "on the opposite side to the first part" only, the stud of FIG. 12 having them only in the surface 72 that acts as an "anti-pull-out" surface. Of course, it is possible to provide recesses in both portions of the surface of the head 70 of a stud 30 according to the invention.

FIGS. 13A to 13F depict a number of recess geometries. By way of example, the recess may have the geometry of a pyramid on a rectangular base (FIG. 13A), the geometry of a geodesic dome on a rectangular base (FIG. 13B), the geometry of a "mortise" shaped prism (FIG. 13C), the geometry of a pyramid on a circular base (FIG. 13D), the geometry of a hemisphere (FIG. 13E), and the geometry of a truncated ellipsoid (FIG. 13F). The geometries of FIGS. 13C and 13F have the advantage that that portion of the rubber mix that enters the recess has a maximum cross section that is larger than the cross section of the recess on the surface of the head, thus increasing the anchorage effect in the direction perpendicular to the cross section of the recess on the surface of the head.

Of course, the orifice via which the recess opens onto the surface of the head is not necessarily rectangular or spherical; there are a great many other possible orifice geometries.

Figure 14:
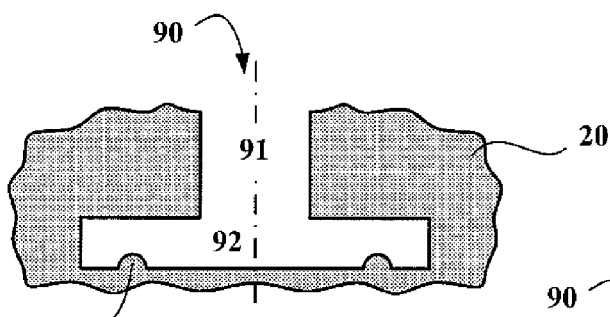
FIGS. 14 to 16 depict the closed end of a stud hole according to an embodiment of the invention.
Figure 15:
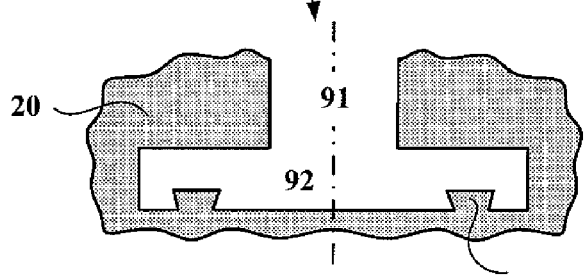
Figure 16:
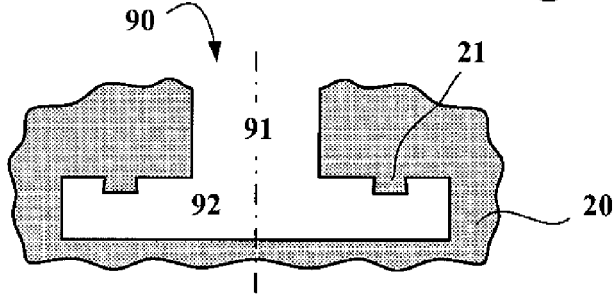

FIGS. 14 to 16 each depict the closed end of a stud hole 90 of a tire according to the invention, configured to receive a stud 30 according to the invention. Each stud hole 90 comprises a cylindrical portion 91 open to the outside of the tread 20 and a portion 92 designed to receive the head of a stud according to the invention. The tread 20 comprises projecting parts 21 situated inside the stud hole and configured to fill the recess in the stud when the stud is inserted into the stud hole. The presence of these projecting parts 21 favors the filling of the recess of the stud with rubber mix and thus improves the "self-positioning" phenomenon because there is also an effect similar to a clip-fastening effect when the stud is in the desired position with respect to the stud hole.

Figure 17:
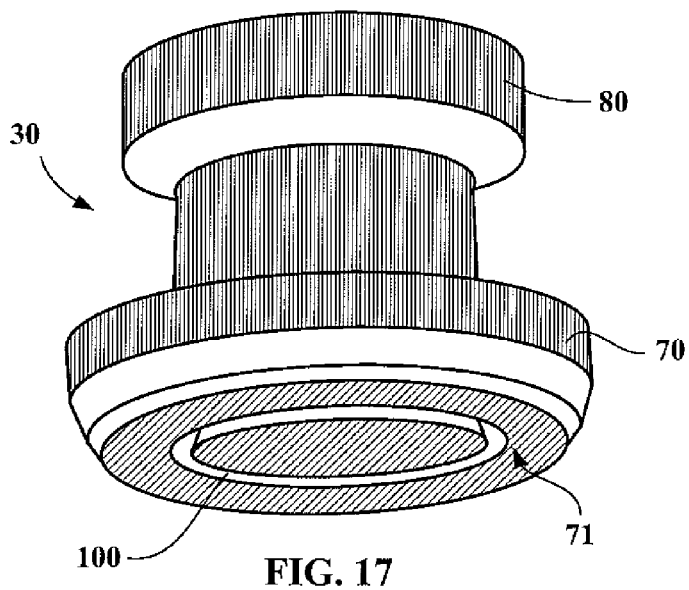
FIG. 17 depicts part of the body and the head of a stud according to an embodiment of the invention.

FIG. 17 schematically depicts a last variant of a stud according to the invention. The head 70 of the stud 30 has a flat surface 71 on the opposite side to the first part (not depicted) and a recess 100 opening onto the surface of the head are positioned in this surface 71 of the head 70. The recess 100 has the geometry of a circular groove. It is configured to be filled with rubber mix of the tread so as to provide additional anchorage for the stud in the tread.

The cross section of the recess 100 at the surface 71 of the head is equal to 10% of the maximum cross section of the head at right angles to the axis of the stud.

The invention claimed is:

1. A stud for a tire, the tire comprising a tread made of rubber mix, the stud having an axis and two axial ends and comprising:
   a first part configured to come into contact with the ground when the stud is fitted to the tire and the tire is rolling along the ground, said first part being positioned at one of the two axial ends of the stud;
   a head configured to anchor the stud into the tread of the tire, said head being positioned at the other axial end of the stud and having no central recess along said axis; and
   a body connecting said first part and said head of the stud, the mean diameter of said body being smaller than the mean diameter of said head of the stud, these mean diameters being measured at right angles to the axis of the stud,
   wherein said head comprises at least one lateral recess opening onto a surface of said head, said at least one lateral recess being configured to be filled with rubber mix of the tread so as to provide additional anchorage for the stud in the tread, wherein said at least one lateral recess opening onto a surface of said head is located in regions laterally spaced from the axis of the stud, and wherein the combined surface area of the cross sections of said at least one lateral recess in said surface of said head is greater than or equal to 15% and less than or equal to 35% of the maximum cross section of said head at right angles to the axis of the stud.

2. The stud of claim 1, wherein a mean axial depth of said at least one lateral recess is greater than or equal to 0.5 mm.

3. The stud of claim 1, wherein said head has a flat surface at the opposite end to said first part and said at least one lateral recess opens onto said flat surface of the head.

4. The stud of claim 1, wherein said head comprises a surface configured to act as an anti-pull-out surface and said at least one lateral recess opens onto said surface configured to act as an anti-pull-out surface.

5. The stud of claim 1, wherein said head comprises a lateral surface and said at least one lateral recess opens onto said lateral surface.

6. The stud of claim 5, wherein a mean radial depth of said at least one lateral recess is greater than or equal to 0.5 mm.

7. The stud of claim 1, wherein the geometry of said at least one lateral recess is one or more of a parallelepiped, a prism, a pyramid, a hemisphere, a cylinder and an ellipsoid.

8. An assembly formed by a tire and at least one stud according to claim 1.

9. The stud of claim 1, wherein the cross section of said at least one lateral recess at the surface of said head is greater than or equal to 10% of the maximum cross section of said head at right angles to the axis of the stud.

10. A stud for a tire, the tire comprising a tread made of rubber mix, the stud having an axis and two axial ends and comprising:

a first part configured to come into contact with the ground when the stud is fitted to the tire and the tire is rolling along the ground, said first part being positioned at one of the two axial ends of the stud;

a head configured to anchor the stud into the tread of the tire, said head being positioned at the other axial end of the stud and having no central recess along said axis; and a body connecting said first part and said head of the stud, the mean diameter of said body being smaller than the mean diameter of said head of the stud, these mean diameters being measured at right angles to the axis of the stud, wherein said head comprises at least one lateral recess opening onto a surface of said head, said at least one lateral recess being configured to be filled with rubber mix of the tread so as to provide additional anchorage for the stud in the tread, wherein said at least one lateral recess opening onto a surface of said head is located in regions laterally spaced from the axis of the stud, and wherein the cross section of said at least one lateral recess at the surface of said head is greater than or equal to 10% of the maximum cross section of said head at right angles to the axis of the stud.

11. An assembly formed by a tire and at least one stud, the tire comprising a tread made of rubber mix, the stud having an axis and two axial ends and comprising:

a first part configured to come into contact with the ground when the stud is fitted to the tire and the tire is rolling along the ground, said first part being positioned at one of the two axial ends of the stud;

a head configured to anchor the stud into the tread of the tire, said head being positioned at the other axial end of the stud and having no central recess along said axis; and a body connecting said first part and said head of the stud, the mean diameter of said body being smaller than the mean diameter of said head of the stud, these mean diameters being measured at right angles to the axis of the stud, wherein said head comprises at least one lateral recess opening onto a surface of said head, said at least one lateral recess being configured to be filled with rubber mix of the tread so as to provide additional anchorage for the stud in the tread, wherein said at least one lateral recess opening onto a surface of said head is located in regions laterally spaced from the axis of the stud, and wherein the tire comprises a tread made of rubber mix, said tread having at least one stud hole comprising a cylindrical portion open to the outside of the tread, said at least one stud hole being configured to accept said at least one stud, wherein the tread comprises a projecting part situated on the inside of said at least one stud hole and configured to fill said at least one lateral recess of said at least one stud when said at least one stud is fitted into said at least one stud hole.

* * * * *